(12) United States Patent
Wang et al.

(10) Patent No.: US 9,242,446 B2
(45) Date of Patent: Jan. 26, 2016

(54) MANUFACTURING METHOD OF COMPOSITE MATERIAL

(71) Applicant: ASUSTeK COMPUTER INC., Taipei (TW)

(72) Inventors: Hung-Yuan Wang, Taipei (TW); Yang-Po Chiu, Taipei (TW); Chih-Hung Chuang, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 334 days.

(21) Appl. No.: 13/887,624

(22) Filed: May 6, 2013

(65) Prior Publication Data

US 2013/0299071 A1 Nov. 14, 2013

Related U.S. Application Data

(60) Provisional application No. 61/645,766, filed on May 11, 2012.

(30) Foreign Application Priority Data

Mar. 27, 2013 (TW) .............................. 102110953 A

(51) Int. Cl.
*B32B 38/00* (2006.01)
*B29C 70/08* (2006.01)
*B32B 38/12* (2006.01)
(Continued)

(52) U.S. Cl.
CPC ........... *B32B 38/0012* (2013.01); *B29C 70/088* (2013.01); *B29C 70/202* (2013.01); *B29C 70/46* (2013.01); *B32B 38/12* (2013.01); *B29C 66/721* (2013.01); *B32B 15/00* (2013.01); *B32B 37/12* (2013.01); *B32B 2305/076* (2013.01); *B32B 2311/30* (2013.01); *Y10T 156/1002* (2015.01)

(58) Field of Classification Search
CPC .... B29C 70/088; B29C 66/721; B29C 70/46; B32B 15/00; B32B 2305/076; B32B 2311/30; B32B 37/12; Y10T 156/1002
USPC ......................................................... 156/242
See application file for complete search history.

(56) References Cited

U.S. PATENT DOCUMENTS 5,643,384 A * 7/1997 Okabe ........................... 156/206
7,464,497 B2 12/2008 Rogers et al.
(Continued)

FOREIGN PATENT DOCUMENTS

| CN | 1370113 A | 9/2002 |
|---|---|---|
| CN | 200995905 Y | * 12/2007 |
| TW | 189995 | 9/1992 |
| TW | 201129277 A1 | 8/2011 |
| WO | WO 2009014486 A1 | * 1/2009 |

*Primary Examiner* — Philip Tucker
*Assistant Examiner* — Vicki Wu
(74) *Attorney, Agent, or Firm* — Muncy, Geissler, Olds & Lowe, P.C.

(57) ABSTRACT

A manufacturing method of composite material includes following steps: shaping a stainless steel plate to a stainless structural component; putting the stainless structural component in a female mold; putting a fiber material over a surface of the stainless structural component away from the female mold; and pressing a male mold towards the female mold to make the fiber material attached to the stainless structural component. The present invention is able to make different materials attached to each other to form a composite material in a simple and efficient manufacturing process, and the composite material is light; thin and has advantages of high rigidity and high strength.

7 Claims, 11 Drawing Sheets

(51) Int. Cl.
  *B29C 70/46* (2006.01)
  *B29C 70/20* (2006.01)
  *B29C 65/00* (2006.01)
  *B32B 15/00* (2006.01)
  *B32B 37/12* (2006.01)

(56) References Cited

U.S. PATENT DOCUMENTS

2004/0175554 A1* 9/2004 Clifford .................... 428/292.1
2011/0197444 A1* 8/2011 Kim ......................... 29/890.036

* cited by examiner

US 9,242,446 B2

MANUFACTURING METHOD OF COMPOSITE MATERIAL

CROSS-REFERENCE TO RELATED APPLICATION

This application claims the priority benefit of U.S. provisional application Ser. No. 61/645,766, filed on May 11, 2012, and a Patent Application No. 102110953 filed in Taiwan on Mar. 27, 2013. The entirety of the above-mentioned patent applications is hereby incorporated by reference herein and made a part of specification.

BACKGROUND OF THE INVENTION

1. Field of the Invention

The invention relates to a manufacturing method of a composite material and, more particularly, to a manufacturing method of a composite material including a stainless material and a fiber material.

2. Description of the Related Art

A casing of an electronic device, such as a mobile phone, a computer, a play station and a personal digital assistant (PDA), is usually made of metal (such as a stainless steel, an aluminum alloy and a magnesium alloy) to meet a requirement of high rigidity, and it would not be easily damaged due to an external impact. Recently, portable electronic devices become lighter and thinner, which should be considered in choosing the material of the casing.

In manufacture, a metal casing is usually shaped by punching or cold forging. In order to make the structure have high rigidity and high strength, following materials and methods are used: when the aluminum alloy is used, an aluminum alloy plate with sufficient thickness is punched for shaping, and then it is attached to other structures by gluing, or the casing is shaped via the cold forging to form an inner structure and an outer structure at the same time, and then the casing is processed via a computer numerical control (CNC). However, the aluminum alloy is relatively light, and thus its thickness should be increased to meet the requirement of strength, which makes it difficult to make the casing thinner.

When a stainless steel material is used, since the stainless steel has good rigidity, a thin stainless steel plate is shaped by punching, and then it is attached to other structures via gluing. Though the casing made of the stainless steel material is thin, it is heavy due to a high density.

Comparing to the metal, a fiber material (such as carbon fibers, glass fibers or metal fibers) is also used to make the electronic device casing. The fiber material is light, has high rigidity and high strength, and it can form decoration textures after weaving. Though the casing made of the fiber material is light and thin, it is difficult to shape it in the subsequent process or combine it with other structures. Thus, the conventional manufacturing method costs much, the quality of the casing cannot be improved, and it is difficult to meet the requirements of rigidity, light, thin and beauty at the limited cost.

BRIEF SUMMARY OF THE INVENTION

A manufacturing method of a composite material includes following steps: shaping a stainless steel plate to a stainless structural component; putting the stainless structural component in a female mold; putting a fiber material over a surface of the stainless structural component away from the female mold, and pressing a male mold towards the female mold to make the fiber material attached to the stainless structural component.

A manufacturing method of a composite material includes following steps: shaping a stainless steel plate to a stainless structural component; making a fiber material to a fiber structure component; putting the stainless structural component in a female mold; coating adhesive on a surface of the stainless structural component away from the female mold, and putting the fiber structure component on the surface of the stainless structural component with adhesive to make the fiber structure component attached to the stainless structural component.

As stated above, the manufacturing method of the composite material can use the stainless steel and the fiber material to make a composite material with high rigidity and high strength in a limited thickness and processing condition. Furthermore, the composite material has advantages of the two materials, such as high rigidity, light, thin and simple manufacturing process, at the same time with a low cost. The manufacturing method of the composite material can choose the best combination of materials for different products, which makes the composite material be widely used.

These and other features, aspects and advantages of the present invention will become better understood with regard to the following description, appended claims, and accompanying drawings.

DETAILED DESCRIPTION OF THE EMBODIMENTS

A manufacturing method of a composite material is illustrated with relating figures, and the same symbols denote the same components.

Figure 1A:
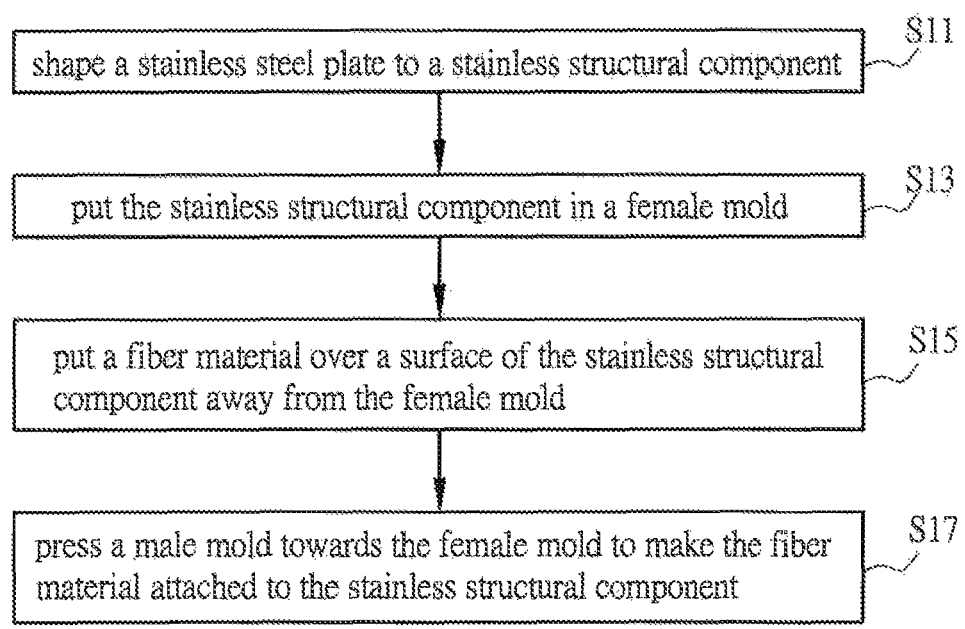
FIG. 1A is a flow chart showing a manufacturing method of a composite material in a first embodiment.

FIG. 1A is a flow chart showing a manufacturing method of a composite material in a first embodiment. The manufacturing method of the composite material includes following: shaping a stainless steel plate to a stainless structural component (S11); putting the stainless structural component in a female mold (S13); putting a fiber material over a surface of the stainless structural component, and the surface is away from the female mold (S15); and pressing a male mold towards the female mold to make the fiber material attached to the stainless structural component (S17).

Figure 1B:
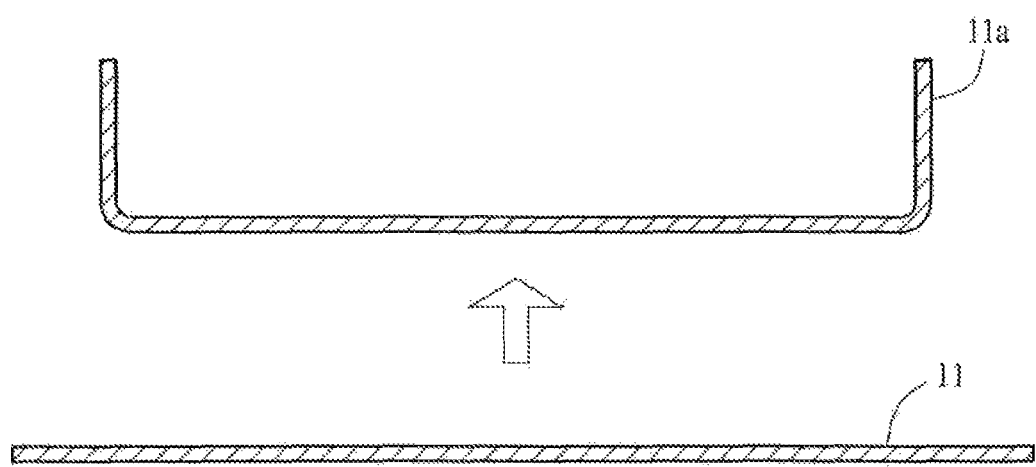
FIG. 1B to FIG. 1D are schematic diagrams showing a manufacture process of the composite material according to the manufacturing method in FIG. 1A.
Figure 1C:
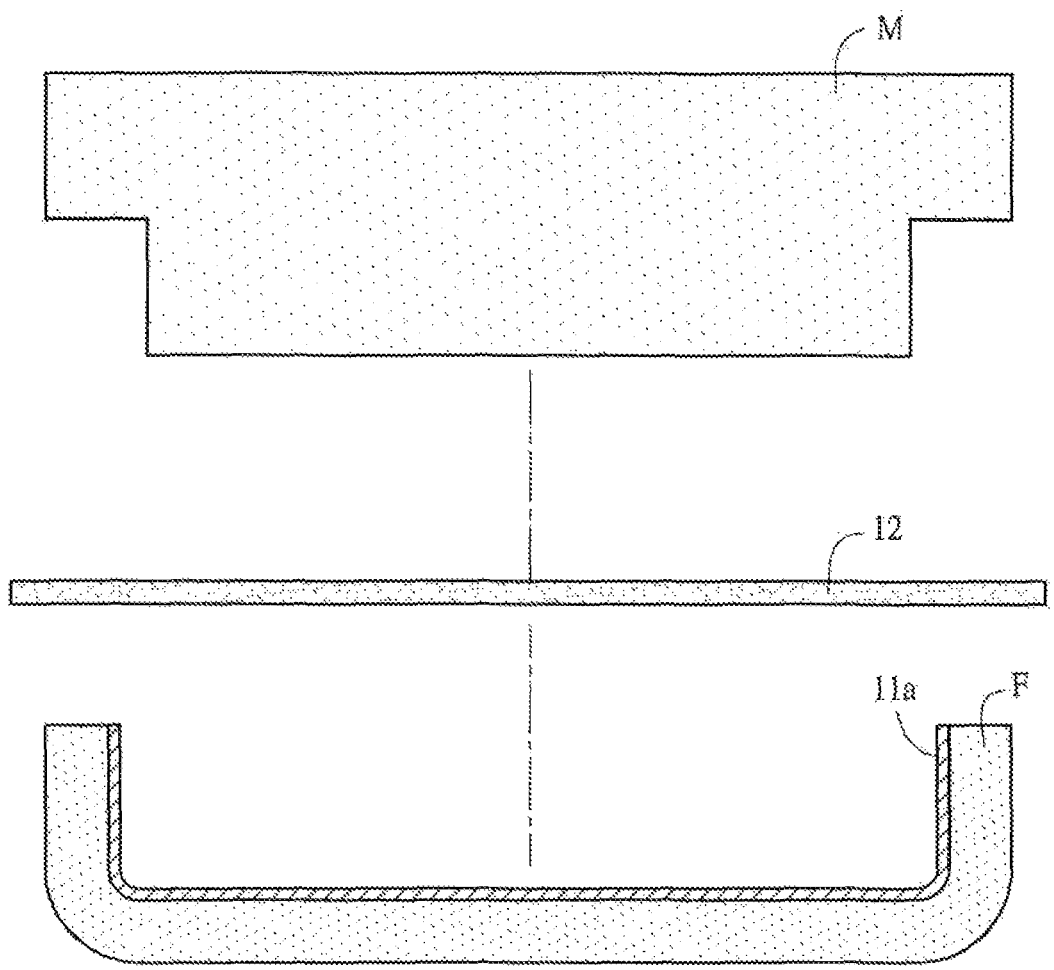
Figure 1D:
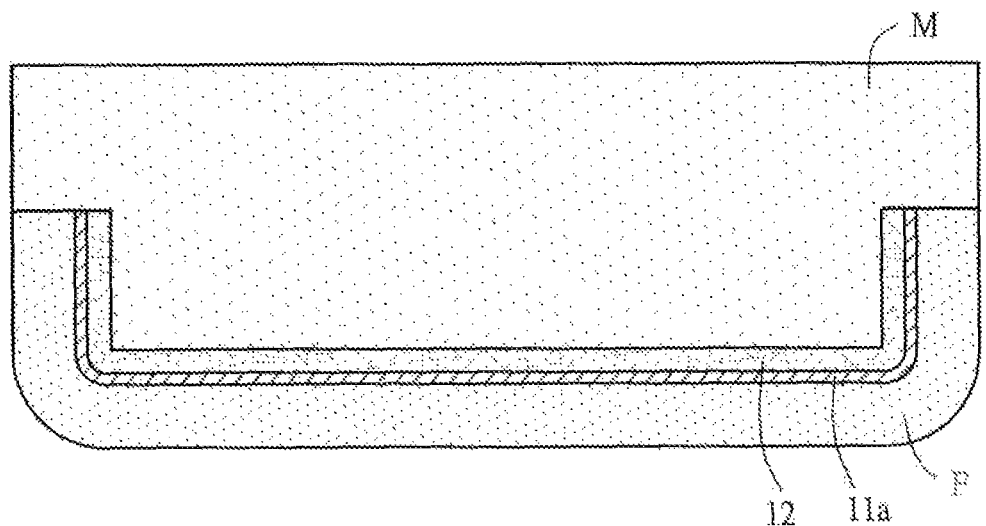

FIG. 1B to FIG. 1D are schematic diagrams showing a manufacture process of the composite material in the manufacturing method in FIG. 1A. In the step S11, a stainless steel plate 11 is shaped to a stainless structural component 11a. The shaping method may be punching, cold forging, hot forging or casting, which is not limited herein. In the embodiment, the stainless structural component 11a is in a U-shape, and it may also be shaped according to an attached device or structure, which is not limited herein.

In the step S13, the stainless structural component 11a is put into a mold cavity of the female mold F. The size of the mold cavity matches with the stainless structural component 11a, which is not limited. As shown in FIG. 1C, after the stainless structural component 11a is put into the mold cavity, the fiber material 12 is put over the surface of the stainless structural component 11a away from the female mold in the step S15. Since the fiber material 12 is not processed, it cannot contact with the surface of the stainless structural component 11a. In the embodiment, the ratio between the thickness of the stainless structural component 11a and the thickness of the fiber material 12 is 1:4 to 2:3, and preferably 3:7. The composite material with the preferred ratio has a better balance in strength and weight.

In the step S17, the male mold M is pressed towards the female mold F to make the fiber material 12 attached to the stainless structural component 11a. The shape of the male mold M is designed according to the wanted shape of the fiber material, which is not limited. When the fiber material 12 is shaped, it attaches to the stainless structural component 11a via its viscosity and a pressure from the mold.

Adhesive may be coated between the stainless structural component 11a and the fiber material 12 to reinforce the attaching, which is not limited.

A carbon fiber prepreg is taken as an example of the fiber material 12, and the fiber material 12 is pre-weaved. The fiber material may also be one or a combination of glass fibers, organic fibers, aramid fibers or metal fibers which are pre-soaked, which are not limited herein. Moreover, the presoaking of the fiber material is known by persons with ordinary skills in the art, which is omitted herein.

After the step S17 is finished, the mold containing the stainless structural component 11a and the fiber material 12 is put into a chamber (not shown) which is controlled under a specific circumstance. After the chamber is closed, it is vacuumized until the air pressure inside the chamber reaches 102 Pa, which is not limited. The specific circumstance includes controlling vacuum, heating or filling air. The chamber is vacuumized to generate air pressure to the mold and improve molding effect of the stainless structural component 11a and the fiber material 12 inside the mold, and the vacuum herein allows small errors.

After the chamber is vacuumized, it is heated. In the embodiment, the chamber is heated to 140 degrees to 170 degrees. Thus, the fiber material 12 is shaped to the fiber structure component 12a and the stainless structural component 11a is attached to the fiber structure component 12a closely by vacuumizing and heating the chamber.

As stated above, in the embodiment, a temperature curve of the stainless steel is calculated and stress parameters are analyzed first. Then, stress problems of the two materials can be avoided via material choosing, structure design and angle adjusting. The deforming problem when the different materials are heated in combining can be overcome by controlling the shape of the mold and circumstances of the chamber, and the precision of the composite material and adhesiveness between different materials are further improved.

Since in the manufacturing method of the composite material, the two materials do not need to be pre-shaped, the manufacture efficiency is improved. On the other hand, the deforming problem when the different materials are combined to form the composite material can be overcome by precisely analyzing the stress parameters of the materials and controlling the mold shape and the circumstance in the chamber. Since the stainless steel and the fiber prepreg can be combined without the adhesive in the manufacturing method, the deforming or attaching problem of the composite material can be avoided.

Figure 1E:
FIG. 1E is a side view showing the composite material made by the manufacturing method in FIG. 1A.
Figure 1F:
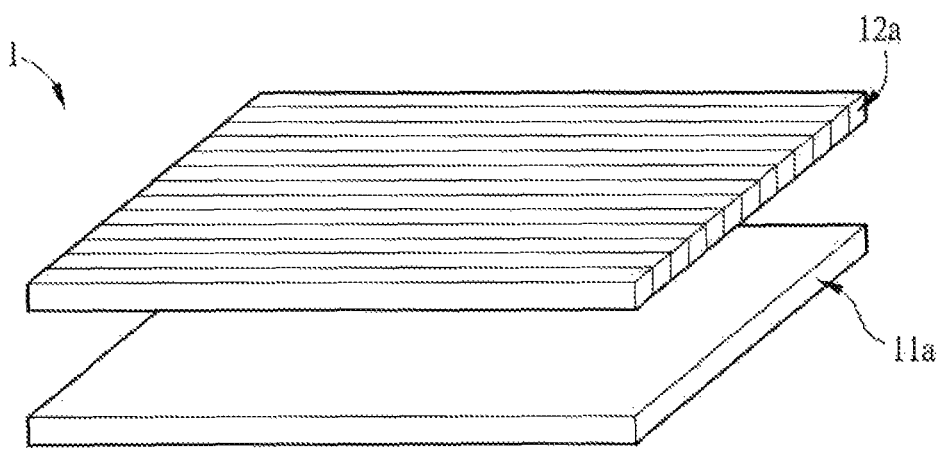
FIG. 1F is an exploded diagram showing a part of the composite material in FIG. 1E.

FIG. 1E is a side view showing the composite material made in the manufacturing method in FIG. 1A, and FIG. 1F is an exploded diagram showing a part of the composite material in FIG. 1E. Please refer to FIG. 1E and FIG. 1F, the composite material 1 manufactured by the manufacturing method includes the stainless structural component 11a and the fiber structure component 12a tightly attaching to each other. In the embodiment, the fiber structure component 12a is a single-layer structure, and the fiber weaving direction of the fiber structure component 12a is one way distribution. The fiber structure component 12a of the single-layer structure may also include different fiber directions, which is not limited herein. Moreover, the fiber direction of the fiber structure component 12a is substantially the same as that of the fiber structure component 12a, which is omitted.

As stated above, the unidirectional fiber prepreg can make the composite material 1 has high rigidity, high strength and uniformed fiber distribution, which means, the composite material 1 having uniform one way fiber direction has an even performance of mechanical strength, such as thermal expansion, to make the composite material 1 appropriate to be applied to a device in need of an even surface material. The fiber material may also have different fiber directions, which is not limited herein.

Figure 2A:
FIG. 2A is a side view showing a composite material of another pattern in the first embodiment.
Figure 2B:
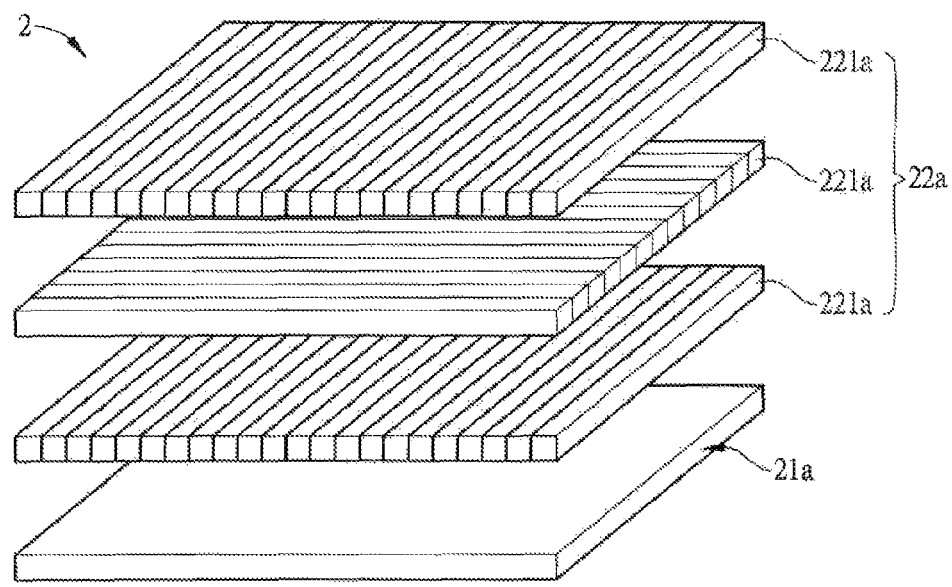
FIG. 2B is an exploded diagram showing a part of the composite material in FIG. 2A.

FIG. 2A is a side view showing a composite material of another pattern in the first embodiment, and FIG. 2B is an exploded diagram showing a part of the composite material in FIG. 2A. Please refer to FIG. 2A and FIG. 2B, the composite material 2 in the embodiment has similar structure with that in the above embodiment, and the difference is that the fiber structure component 22a is a three-layer structure, which means, the composite material 2 includes a stainless structural component 21a and three fiber structure layers 221a.

In the embodiment, the fiber structure component 22a including three fiber structure layers 221a has different fiber directions. Adjacent two fiber structure layers 221a have different fiber directions, respectively. The three fiber structure layers 221a may be weaved by a same fiber material or different fiber materials, which is not limited herein, as long as the fiber direction of each adjacent layers of the composite material 2 is vertical to each other at a projection direction to make the composite material 2 have high rigidity and high strength. The strength of the composite material 2 is improved via the fiber structure component 22a of a multi-layer structure, and the number of the fiber structure layers can be increased or decreased according to requirements.

Furthermore, the fiber structure component 22a includes three fiber structure layers 221a in the embodiment, the ratio between the thickness of the stainless structural component 21a and the thickness of the fiber structure component 22a is 2:8 to 4:6, and preferably 3:7.

Figure 3A:
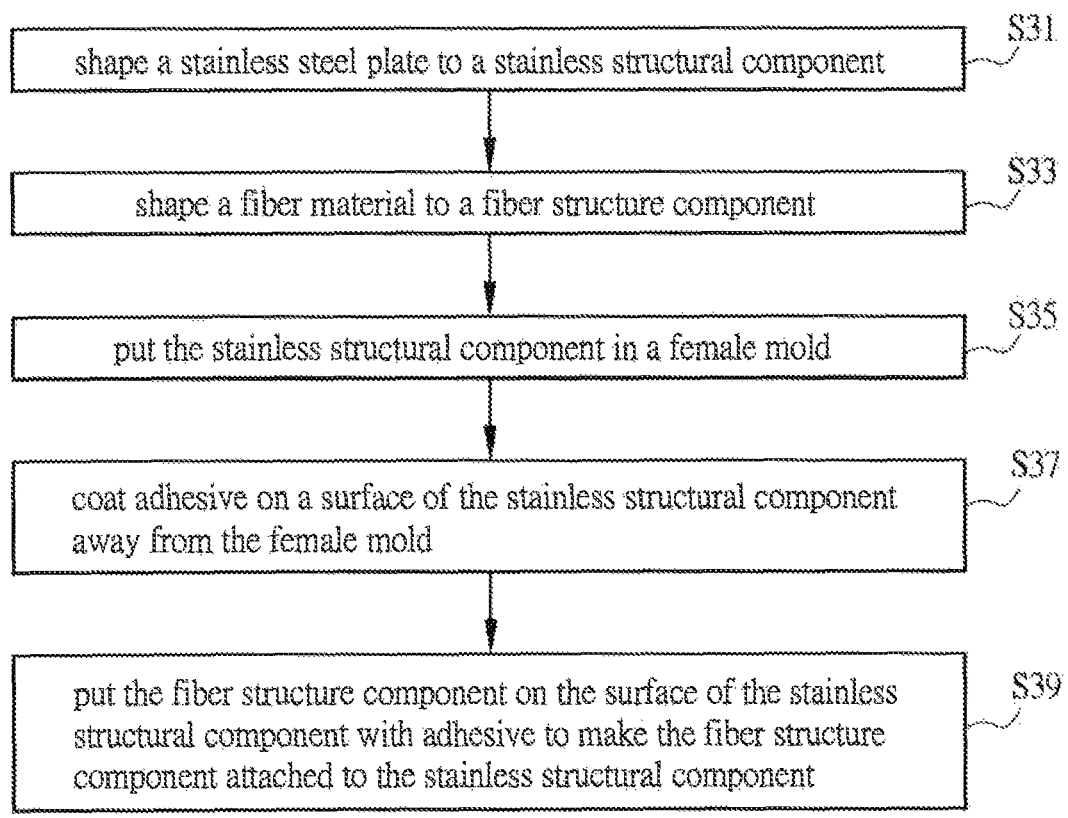
FIG. 3A is a flow chart showing a manufacturing method of a composite material in a second embodiment.

FIG. 3A is a flow chart showing a manufacturing method of a composite material in a second embodiment, and FIG. 3B to FIG. 3E are schematic diagrams showing a manufacture process of the composite material according to the manufacturing method in FIG. 3A. Please refer to FIG. 3A to FIG. 3E, in the embodiment, the manufacturing method of the composite material 3 includes following steps: shaping a stainless steel plate to a stainless structural component (S31); making a fiber material to a fiber structure component (S33); putting the stainless structural component in a female mold (S35); coating adhesive on a surface of the stainless structural component away from the female mold (S37), and putting the fiber structure component on the surface of the stainless structural component which is coated with the adhesive to make the fiber structure component attached to the stainless structural component (S39).

Most steps of the manufacturing method are the same as those in the first embodiment, and the difference is that after the fiber material is shaped to the fiber structure component, the stainless structural component is attached to the fiber structure component via the adhesive.

Figure 3B:
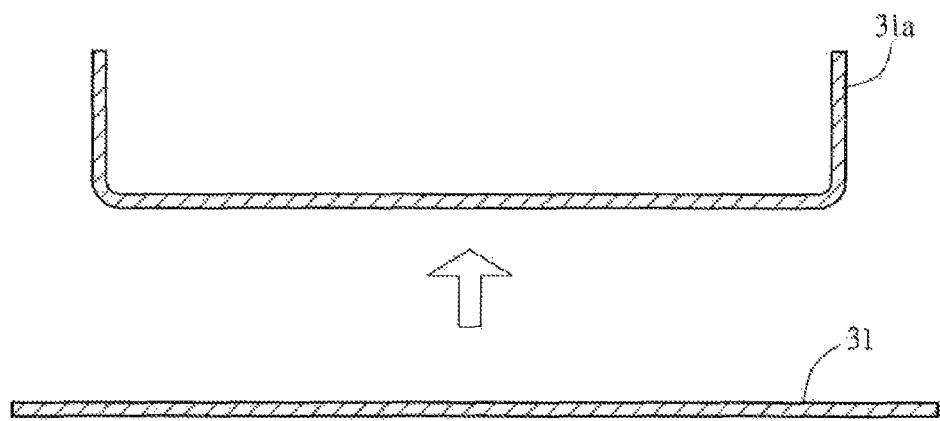
FIG. 3B to FIG. 3E are schematic diagrams showing a manufacture process of the composite material according to the manufacturing method in FIG. 3A.
Figure 3C:
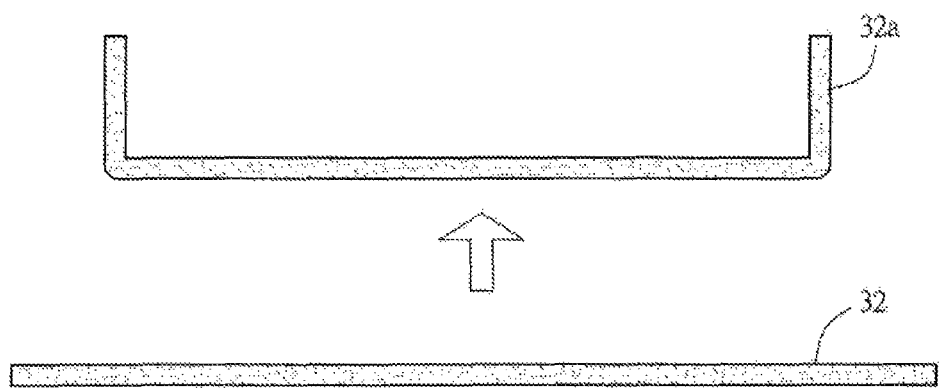

In the embodiment, the stainless steel plate 31 is shaped to the stainless structural component 31a, and the fiber material 32 is shaped to the fiber structure component 32a (as shown in FIG. 3B and FIG. 3C). The stainless structural component 31a is shaped by punching, cold forging, hot forging or casting, and the fiber material 32 is shaped by pressing or heating, which is not limited herein.

Figure 3D:
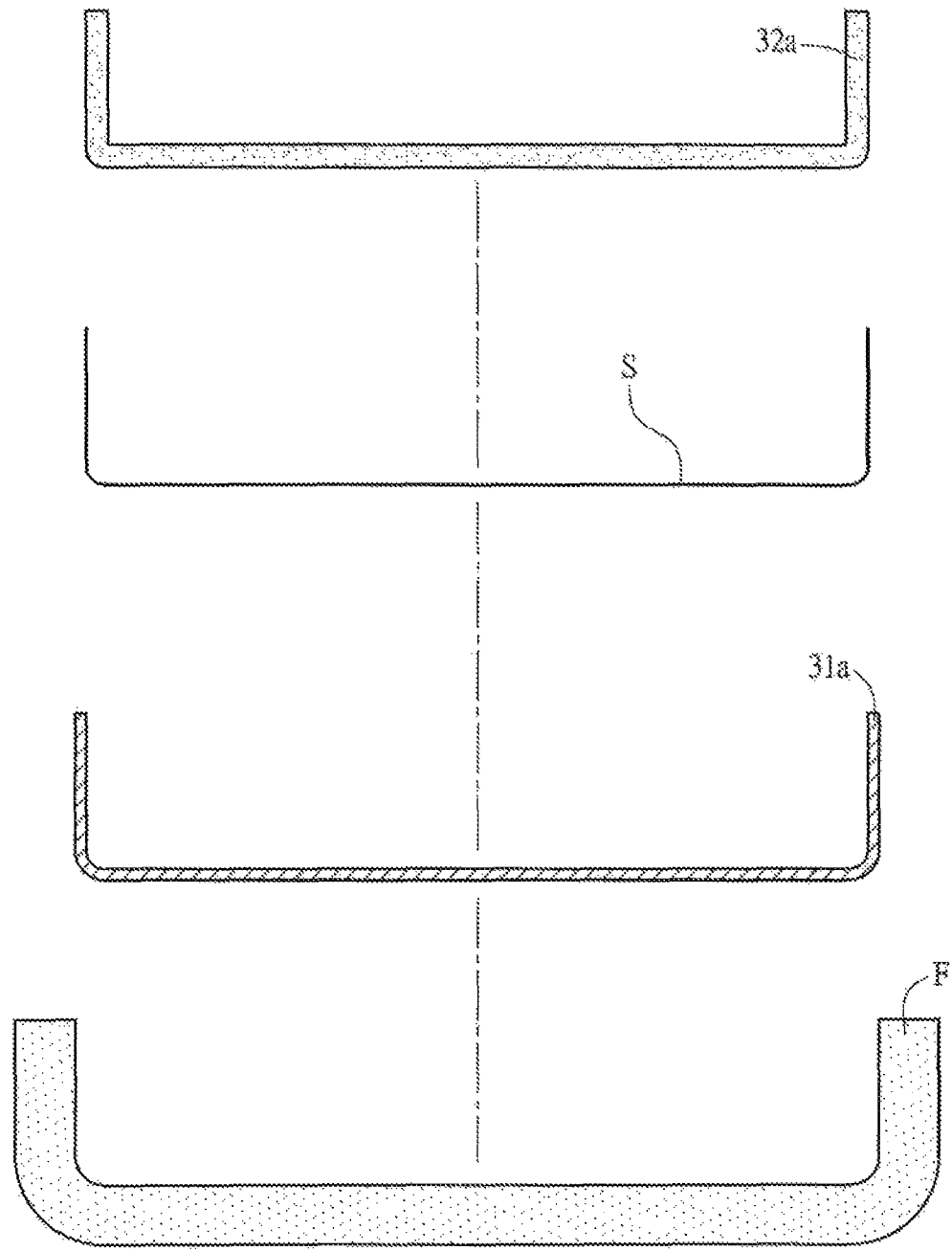

In the step S35, the stainless structural component 31a is put in the female mold F (as shown in FIG. 3D), and the surface of the stainless structural component 31a away from the female mold F is coated with the adhesive S. In the embodiment, AB adhesive is taken as the adhesive, and the AB adhesive is chosen according to features and stress parameters of the stainless structural component 31a and the fiber structure component 32a, and gluing time and strength of the adhesive S can be precisely controlled. Since the gluing time and strength can be controlled, the molding time of the composite material is shortened, and thus the mass production efficiency is improved. The adhesive S may also be epoxy or phenolic resin, which is not limited herein.

Figure 3E:
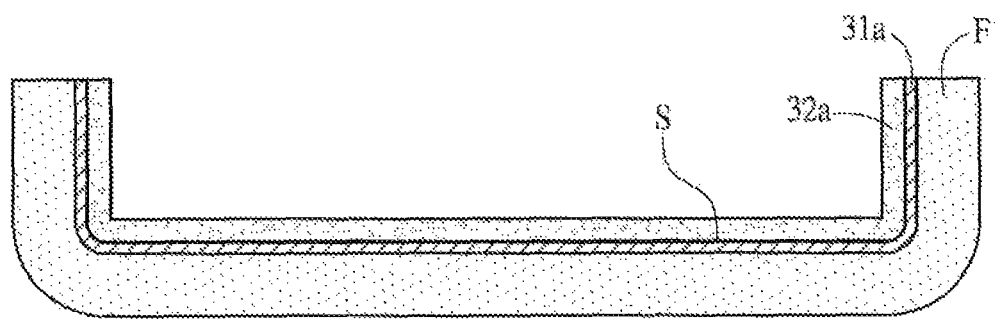

After the surface is coated with the adhesive S, the fiber structure component 32a is put on the surface of the stainless structural component 31a with the adhesive S in the step S39 (as shown in FIG. 3E) to make the fiber structure component 32a attached to the stainless structural component 31a via the adhesive S. After the fiber structure component 32a is put on the stainless structural component 31a, a male mold (not shown) may be pressed towards the female mold F to combine the stainless structural component 31a and the fiber structure component 32a more tightly, which is not limited herein.

In the embodiment, the ratio between the thickness of the stainless structural component 31a and the thickness of the fiber structure component 32a is 3:7, and the composite material 3 with the preferred ratio has a better balance in strength and weight.

Figure 3F:
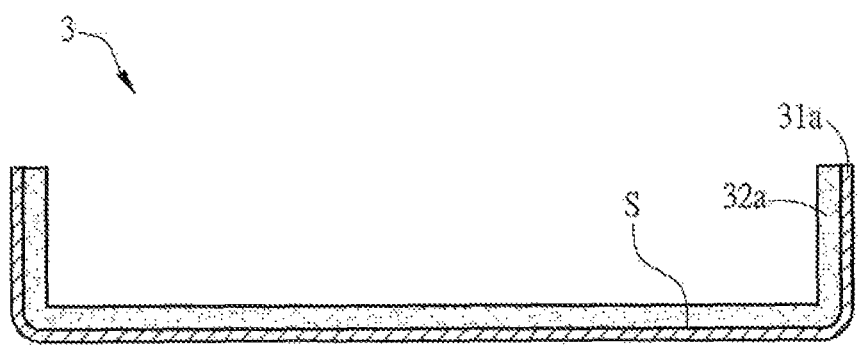
FIG. 3F is a side view showing the composite material made by the manufacturing method in FIG. 3A.

Then, the female mold F including the stainless structural component 31a and the fiber structure component 32a is put into a chamber which is vacuumized and heated. The steps of vacuumizing and heating are illustrated above, which is omitted. In the embodiment, the temperature in the chamber is within 120 degrees, and preferably 80 degrees. The heating temperature can be adjusted according to the type of the adhesive, which is not limited. After the stainless structural component 31a and the fiber structure component 32a are heated, the composite material 3 in FIG. 3F is got.

As stated above, in the manufacturing method, the gluing time and strength between the stainless structural component 31a and the fiber structure component 32a are precisely controlled by choosing the adhesive and adjusting the heating temperature accordingly. Furthermore, stress problems of the two materials can be avoided via material choosing, structure design and angle adjusting. The deforming problem when the different materials are heated in combining can be overcome via a mold design and a circumstance control of the chamber, and the precision of the composite material 3 and attaching of different materials are further improved.

Figure 4:
FIG. 4 is a side view showing a composite material of another pattern in the first embodiment.

FIG. 4 is a side view showing a composite material of another pattern in the first embodiment. In the embodiment, the composite material 4 has similar structures and features with the composite material 1, and the composite material 4 further includes two inner components 43. The two inner components 43 are disposed at an inner side of the fiber structure component 42a, respectively. That means, the composite material 4 includes the stainless structural component 41a, the fiber structure component 42a and two inner components 43 from outside to inside. The inner components 43 may be made of aluminum magnesium alloy to improve the strength of the composite material 4. The material and the disposing position of the inner components are determined according to a cooperated device or a structure and a strength requirement, which is not limited herein.

Furthermore, in the manufacturing method of the composite material, other types of the adhesive may also be chosen to be processed with the two materials, and the molding time of the composite material is shorten to improve mass production efficiency by precisely controlling the gluing time and strength of the adhesive.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A manufacturing method of a composite material, comprising following steps:
    shaping a stainless steel plate into a stainless structural component having a first surface and a second surface opposite to the first surface;
    putting the stainless structural component in a female mold, and the first surface of the stainless structural component contacts with the female mold;
    putting a fiber material over the second surface of the stainless structural component away from the female mold, wherein the fiber material does not contact with the second surface of the stainless structural component when the fiber material is put over the second surface of the stainless structural component away from the female mold; and
    pressing a male mold towards the female mold to make the fiber material attached to the stainless structural component.

2. The manufacturing method according to claim 1, wherein the fiber material is a single-layer structure or a multi-layer structure.

3. The manufacturing method according to claim 2, wherein the fiber material of the single-layer structure or the multi-layer structure has different fiber directions.

4. The manufacturing method according to claim 3, wherein two adjacent layers of the fiber material with the multi-layer structure have different fiber directions.

5. The manufacturing method according to claim 1, wherein the fiber material includes carbon fibers, glass fibers, aramid fibers, metal fibers, organic fibers or the combination thereof.

6. The manufacturing method according to claim 1, wherein a range of a ratio between the thickness of the stainless structural component and the thickness of the fiber material is between 1:4 and 2:3.

7. A manufacturing method of a composite material, comprising following steps:
- shaping a stainless steel plate into a stainless structural component, wherein the stainless structural component has a first surface and a second surface opposite to the first surface;
- putting the stainless structural component in a female mold, wherein the first surface of the stainless structural component contacts with the female mold;
- putting an unpressed fiber material over the second surface of the stainless structural component away from the female mold, wherein the unpressed fiber material does not contact with the second surface of the stainless structural component when the unpressed fiber material is put over the second surface of the stainless structural component away from the female mold; and
- pressing a male mold towards the female mold to press and shape the unpressed fiber material and to make the fiber material attached to the stainless structural component.

\* \* \* \* \*